US012749043B2

(12) United States Patent
Patra et al.

(10) Patent No.: US 12,749,043 B2
(45) Date of Patent: Sep. 29, 2026

(54) COMMUNICATION NETWORK RESOURCE ALLOCATION VIA SEGMENTED DEMAND FORECASTING

(71) Applicant: AT&T Intellectual Property I, L.P., Atlanta, GA (US)

(72) Inventors: Subrat Patra, Schaumburg, IL (US); Nishan Singh, Freehold, NJ (US); Abdulla Udaipurwala, Monroe Township, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 226 days.

(21) Appl. No.: 18/536,158

(22) Filed: Dec. 11, 2023

(65) Prior Publication Data

US 2025/0190937 A1 Jun. 12, 2025

(51) Int. Cl.
*G06Q 10/087* (2023.01)
*G06Q 10/04* (2023.01)
(Continued)

(52) U.S. Cl.
CPC ........... *G06Q 10/087* (2013.01); *G06Q 10/04* (2013.01); *H04W 28/02* (2013.01); *H04W 72/04* (2013.01)

(58) Field of Classification Search
CPC ..... H04W 16/10; H04W 16/22; H04W 28/02; H04W 72/0406; H04W 4/50;
(Continued)

(56) References Cited

U.S. PATENT DOCUMENTS 5,251,209 A * 10/1993 Jurkevich .......... H04Q 11/0478 370/468
6,643,367 B1 * 11/2003 White-Hauser ....... H04J 3/1682 379/265.09

(Continued)

OTHER PUBLICATIONS

Malik Aqsa et al., QoS in IEEE 802.11-based Wireless Networks: A Contemporary Survey Journal of Network and Computer Applications, vol. 55, Sep. 2015, pp. 24-46 (Year: 2015).*

(Continued)

*Primary Examiner* — Scott L Jarrett
(74) *Attorney, Agent, or Firm* — GUNTIN & GUST, PLC; Andrew Gust

(57) ABSTRACT

A processing system may segregate customers of a communication network into communication network customer segments in accordance with at least one factor, generate predicted customer order weights by customer segment for a first network resource type in accordance with at least a first forecasting model, and calculate inventory demand weights for network resources of the first network resource type in accordance with at least a second forecasting model. The processing system may then obtain a new customer order for the first network resource type from a first customer and configure the communication network to process data traffic of the first customer via one of the network resources of the first network resource type that is selected based upon a customer segment of the first customer and an allocation matching scheme in accordance with the predicted customer order weights by communication network customer segment and the plurality of inventory demand weights.

20 Claims, 6 Drawing Sheets

(51) Int. Cl.
*H04W 28/02* (2009.01)
*H04W 72/04* (2023.01)

(58) Field of Classification Search
CPC . H04W 72/04; G06Q 10/06315; G06Q 10/04; G06Q 10/087
See application file for complete search history.

(56) References Cited

U.S. PATENT DOCUMENTS

| | | | | |
|---|---|---|---|---|
| 6,842,428 | B2 * | 1/2005 | Chen | H04L 67/61 370/468 |
| 7,650,152 | B2 * | 1/2010 | Li | H04L 1/0026 370/347 |
| 8,116,781 | B2 * | 2/2012 | Chen | H04W 72/563 455/452.2 |
| 8,374,083 | B2 * | 2/2013 | Shi | H04L 47/24 370/349 |
| 8,406,248 | B2 * | 3/2013 | Pratt, Jr. | H04W 56/002 370/444 |
| 8,570,868 | B2 * | 10/2013 | Reumerman | H04L 12/4135 370/232 |
| 8,924,543 | B2 * | 12/2014 | Raleigh | H04W 4/24 709/224 |
| 9,722,951 | B2 * | 8/2017 | Almadi | H04L 45/02 |
| 9,992,077 | B2 * | 6/2018 | Carlin | H04L 41/5051 |
| 10,064,096 | B2 * | 8/2018 | Lee | H04L 67/63 |
| 10,075,347 | B2 * | 9/2018 | Jain | H04L 41/5012 |
| 10,362,040 | B2 * | 7/2019 | Harris | H04L 63/20 |
| 11,290,986 | B2 * | 3/2022 | Abedini | H04W 16/28 |
| 11,323,890 | B2 * | 5/2022 | Meier-Hellstern | H04L 41/5009 |
| 11,954,177 | B2 * | 4/2024 | Singla | G06F 18/285 |
| 11,991,699 | B2 * | 5/2024 | Abedini | H04W 76/10 |
| 2003/0012143 | A1 * | 1/2003 | Chen | H04L 67/61 370/252 |
| 2003/0046396 | A1 * | 3/2003 | Richter | G06F 11/3433 709/226 |
| 2003/0169681 | A1 * | 9/2003 | Li | H04L 27/2601 370/203 |
| 2005/0254455 | A1 * | 11/2005 | Plehn | H04W 16/18 370/328 |
| 2006/0215600 | A1 * | 9/2006 | Chen | H04W 72/563 370/328 |
| 2007/0043558 | A1 * | 2/2007 | Schwarz | H04L 65/80 704/207 |
| 2007/0239718 | A1 * | 10/2007 | Baxter | H04L 67/04 |
| 2009/0285196 | A1 * | 11/2009 | Lee | H04L 47/623 370/345 |
| 2010/0192212 | A1 * | 7/2010 | Raleigh | G06Q 30/0207 726/7 |
| 2010/0260046 | A1 * | 10/2010 | Reumerman | H04L 47/10 370/328 |
| 2011/0188457 | A1 * | 8/2011 | Shu | H04W 72/04 370/329 |
| 2012/0089727 | A1 * | 4/2012 | Raleigh | H04W 4/24 709/224 |
| 2013/0185436 | A1 * | 7/2013 | Carlin | G06F 9/5011 709/226 |
| 2016/0210578 | A1 * | 7/2016 | Raleigh | H04W 28/0215 |
| 2016/0330134 | A1 * | 11/2016 | Almadi | H04L 45/02 |
| 2019/0014569 | A1 * | 1/2019 | Abedini | H04W 72/20 |
| 2021/0014698 | A1 * | 1/2021 | Meier-Hellstern | H04L 41/5009 |
| 2022/0164593 | A1 * | 5/2022 | Singla | G06F 18/2431 |
| 2023/0060852 | A1 * | 3/2023 | Sidebottom | H04L 41/5051 |
| 2024/0378079 | A1 * | 11/2024 | Shami | G06F 9/5038 |
| 2025/0159446 | A1 * | 5/2025 | Bishop | H04W 4/50 |

OTHER PUBLICATIONS

Quality of Service (QOS) and Policy Management in Mobile Data Networks ixia, 2013 (Year: 2013).*

* cited by examiner

| Cust Name | | Add or Change | Normal Distribution |
|---|---|---|---|
| Cust 25 | | 5 | 0.00781694 |
| Cust 31 | SEGMENT 1 | 7 | 0.013344313 |
| Cust 16 | | 11 | 0.030296462 |
| Cust 17 | | 13 | 0.040292867 |
| Cust 14 | | 13 | 0.040292867 |
| Cust 24 | | 13 | 0.040292867 |
| Cust 20 | | 14 | 0.045039484 |
| Cust 26 | | 14 | 0.045039484 |
| Cust 29 | | 14 | 0.045039484 |
| Cust 11 | | 14 | 0.045039484 |
| Cust 8 | | 15 | 0.04930868 |
| Cust 13 | SEGMENT 2 | 15 | 0.04930868 |
| Cust 2 | | 15 | 0.04930868 |
| Cust 4 | | 15 | 0.04930868 |
| Cust 15 | | 15 | 0.04930868 |
| Cust 7 | | 16 | 0.052871068 |
| Cust 33 | | 17 | 0.055523589 |
| Cust 21 | | 17 | 0.055523589 |
| Cust 18 | | 17 | 0.055523589 |
| Cust 22 | | 18 | 0.057108625 |
| Cust 23 | | 18 | 0.057108625 |
| Cust 1 | | 19 | 0.057529503 |
| Cust 32 | | 23 | 0.048116458 |
| Cust 5 | SEGMENT 3 | 23 | 0.048116458 |
| Cust 12 | | 24 | 0.043682376 |
| Cust 30 | | 25 | 0.038840391 |
| Cust 28 | | 26 | 0.033824054 |
| Cust 19 | | 26 | 0.033824054 |
| Cust 6 | | 28 | 0.024099277 |
| Cust 34 | SEGMENT 4 | 28 | 0.024099277 |
| Cust 3 | | 29 | 0.019716975 |
| Cust 9 | | 30 | 0.015799426 |
| Cust 27 | | 30 | 0.015799426 |
| Cust 10 | | 34 | 0.005290452 |

210

FACTOR WEIGHTS 235

| SUBSCRIBER ID | CIRCUIT COUNT | VOIP COUNT | VPN COUNT | VLAN COUNT | TOTAL | INTENSITY |
|---|---|---|---|---|---|---|
| | 0.3 | 0.15 | 0.15 | 0.4 | 1 | |
| 1 | 1 | 0 | 2 | 4 | 2.2 | 4 |
| 2 | 0 | 0 | 5 | 4 | 2.35 | 4 |
| 3 | 0 | 0 | 1 | 2 | 0.95 | 2 |
| 4 | 1 | 0 | 2 | 3 | 1.8 | 3 |
| 5 | 0 | 0 | 1 | 1 | 0.55 | 1 |
| 6 | 1 | 0 | 1 | 3 | 1.65 | 3 |
| ... | ... | .... | ... | ... | ... | ... |

FIG. 3

FACTOR WEIGHTS 315

310

| SERVICE CATEGORY | SERVICE TYPE | START | END | TOTAL CATEGORY COUNT | SERVICE TYPE COUNT | SEGMENT | TOTAL |
|---|---|---|---|---|---|---|---|
| | | | | 0.2 | 0.4 | 0.4 | 1 |
| VPN | GIGE | 12/3/2023 | 12/9/2023 | 138 | 114 | 1 | 73.6 |
| VPN | GIGE | 12/3/2023 | 12/9/2023 | 138 | 114 | 2 | 74 |
| VPN | GIGE | 12/3/2023 | 12/9/2023 | 138 | 114 | 3 | 74.4 |
| VPN | GIGE | 12/3/2023 | 12/9/2023 | 138 | 114 | 4 | 74.8 |
| VPN | 10-GIGE | 12/3/2023 | 12/9/2023 | 138 | 24 | 1 | 37.6 |
| VPN | 10-GIGE | 12/3/2023 | 12/9/2023 | 138 | 24 | 2 | 38 |
| VPN | 10-GIGE | 12/3/2023 | 12/9/2023 | 138 | 24 | 3 | 38.4 |
| VPN | 10-GIGE | 12/3/2023 | 12/9/2023 | 138 | 24 | 4 | 38.8 |
| VPN | 100-GIGE | 12/3/2023 | 12/9/2023 | ... | ... | 1 | ... |
| ... | ... | .... | ... | ... | ... | ... | ... |

320

| TIME | T-1 | | | T-2 | | | T-3 | | | T-N |
|---|---|---|---|---|---|---|---|---|---|---|
| | INTERFACE TYPE | | | INTERFACE TYPE | | | INTERFACE TYPE | | | |
| CUSTOMER SEGMENT | 100G | 10G | 1G | 100G | 10G | 1G | 100G | 10G | 1G | ... |
| 1 | 78 | 125 | ... | 81 | 127 | ... | 77 | 129 | ... | ... |
| 2 | 66 | 94 | ... | 62 | 99 | ... | 63 | 96 | ... | ... |
| 3 | 122 | 110 | ... | 115 | 101 | ... | 117 | 104 | ... | ... |
| 4 | 88 | 152 | ... | 94 | 144 | ... | 97 | 157 | ... | ... |

325

TIME SERIES OF HISTORICAL CUSTOMER ORDER WEIGHTS BY COMMUNICATION NETWORK CUSTOMER SEGMENT FOR 100G, 10G, AND 1G NETWORK RESOURCE TYPES

FACTOR WEIGHTS 335

330

| EQUIPMENT ID | SERVICE TYPE | START | END | BW PERCENT USED | VRF PERCENT USED | VLAN PERCENT USED | BGP PERCENT USED | TOTAL |
|---|---|---|---|---|---|---|---|---|
| | | | | 0.3 | 0.15 | 0.2 | 0.35 | 1 |
| ROUTER 1 | GIGE | 12/3/2023 | 12/9/2023 | 34 | 0 | 0 | 23 | 18.25 |
| ROUTER 1 | 10-GIGE | 12/3/2023 | 12/9/2023 | 21 | 0 | 0 | 23 | 14.35 |
| ROUTER 1 | 100-GIGE | 12/3/2023 | 12/9/2023 | 14 | 0 | 0 | 23 | 12.25 |
| ROUTER 2 | GIGE | 12/3/2023 | 12/9/2023 | 37 | 44 | 0 | 0 | 17.7 |
| ROUTER 2 | 10-GIGE | 12/3/2023 | 12/9/2023 | 25 | 44 | 0 | 0 | 14.1 |
| ROUTER 2 | 100-GIGE | 12/3/2023 | 12/9/2023 | 10 | 44 | 0 | 0 | 9.6 |
| ROUTER 3 | GIGE | 12/3/2023 | 12/9/2023 | 22 | 5 | 0 | 0 | 7.35 |
| ROUTER 3 | 10-GIGE | 12/3/2023 | 12/9/2023 | 29 | 5 | 0 | 0 | 9.45 |
| ROUTER 3 | 100-GIGE | 12/3/2023 | 12/9/2023 | 40 | 5 | 0 | 0 | 12.75 |
| ROUTER 4 | GIGE | 12/3/2023 | 12/9/2023 | 11 | 23 | 0 | 0 | 6.75 |
| ... | ... | .... | ... | ... | ... | ... | ... | ... |

355

TIME SERIES OF INVENTORY DEMAND WEIGHTS

| TIME PERIOD | CLASS | RESOURCE TYPE | SEGMENT | PREDICTED ORDER WEIGHT |
|---|---|---|---|---|
| 12/28/2022 | 1 | 1 | 1 | 1.766157602 |
| 12/28/2022 | 1 | 10 | 1 | 1.564791372 |
| 12/28/2022 | 1 | 100 | 1 | 1.235068381 |
| 1/28/2023 | 1 | 1 | 1 | 2.222550708 |
| 1/28/2023 | 1 | 10 | 1 | 2.104109702 |
| 1/28/2023 | 1 | 100 | 1 | 1.746428185 |
| 2/28/2023 | 1 | 1 | 1 | 2.247827215 |
| 2/28/2023 | 1 | 10 | 1 | 2.409405304 |
| 2/28/2023 | 1 | 100 | 1 | 1.766385797 |
| 12/28/2022 | 1 | 1 | 2 | 1.778136325 |
| 12/28/2022 | 1 | 10 | 2 | 1.656966298 |
| 12/28/2022 | 1 | 100 | 2 | 1.336986539 |
| 1/28/2023 | 1 | 1 | 2 | 2.233126443 |
| 1/28/2023 | 1 | 10 | 2 | 2.149669449 |
| 1/28/2023 | 1 | 100 | 2 | 1.749394745 |
| 2/28/2023 | 1 | 1 | 2 | 2.282923026 |
| 2/28/2023 | 1 | 10 | 2 | 2.443154884 |
| 2/28/2023 | 1 | 100 | 2 | 1.769677711 |
| 12/28/2022 | 1 | 1 | 3 | 1.7824135 |
| 12/28/2022 | 1 | 10 | 3 | 1.67243667 |
| 12/28/2022 | 1 | 100 | 3 | 1.254500206 |
| 1/28/2023 | 1 | 1 | 3 | 2.227004005 |
| 1/28/2023 | 1 | 10 | 3 | 2.165772389 |
| 1/28/2023 | 1 | 100 | 3 | 1.766768838 |
| 2/28/2023 | 1 | 1 | 3 | 2.282200838 |
| 2/28/2023 | 1 | 10 | 3 | 2.421179517 |
| 2/28/2023 | 1 | 100 | 3 | 1.79665948 |
| 12/28/2022 | 1 | 1 | 4 | 1.868208045 |
| 12/28/2022 | 1 | 10 | 4 | 1.671905345 |
| 12/28/2022 | 1 | 100 | 4 | 1.274543863 |
| 1/28/2023 | 1 | 1 | 4 | 2.372165171 |

410

| TIME PERIOD | RESOURCE TYPE | ELEMENT ID | SUSTAINABILITY WEIGHT (PRED.) |
|---|---|---|---|
| 12/28/2022 | 1 | 46367 | 26.6591179 |
| 12/28/2022 | 10 | 46367 | 22.87044178 |
| 12/28/2022 | 100 | 46367 | 20.73464089 |
| 1/28/2023 | 1 | 46367 | 26.71963941 |
| 1/28/2023 | 10 | 46367 | 22.97486742 |
| 1/28/2023 | 100 | 46367 | 20.81975575 |
| 2/28/2023 | 1 | 46367 | 26.71963941 |
| 2/28/2023 | 10 | 46367 | 22.97486742 |
| 2/28/2023 | 100 | 46367 | 20.81975575 |
| 12/28/2022 | 1 | 54819 | 34.99784122 |
| 12/28/2022 | 10 | 54819 | 31.22228498 |
| 12/28/2022 | 100 | 54819 | 28.99953067 |
| 1/28/2023 | 1 | 54819 | 35.14699119 |
| 1/28/2023 | 10 | 54819 | 31.41533908 |
| 1/28/2023 | 100 | 54819 | 29.17368117 |
| 2/28/2023 | 1 | 54819 | 35.14699119 |
| 2/28/2023 | 10 | 54819 | 31.41533908 |
| 2/28/2023 | 100 | 54819 | 29.17368117 |
| 12/28/2022 | 1 | 100309 | 14.02359356 |
| 12/28/2022 | 10 | 100309 | 9.855044805 |
| 12/28/2022 | 100 | 100309 | 7.860514961 |
| 1/28/2023 | 1 | 100309 | 14.05753737 |
| 1/28/2023 | 10 | 100309 | 9.901976775 |
| 1/28/2023 | 100 | 100309 | 7.940714335 |
| 2/28/2023 | 1 | 100309 | 14.05753737 |
| 2/28/2023 | 10 | 100309 | 9.901976775 |
| 2/28/2023 | 100 | 100309 | 7.940714335 |
| 12/28/2022 | 1 | 111656 | 10.34441047 |
| 12/28/2022 | 10 | 111656 | 6.492072917 |
| 12/28/2022 | 100 | 111656 | 4.471650569 |
| 1/28/2023 | 1 | 111656 | 10.37374409 |

420

| Predicted Weight | Sustainable Predicted Weight Preference | | | |
|---|---|---|---|---|
| | 1 | 2 | 3 | 4 |
| 1.67243667 | 6.49 | 9.85 | 22.28 | 31.22 |
| 1.671905345 | 9.85 | 22.28 | 31.22 | 6.49 |
| 1.656966298 | 22.28 | 31.22 | 9.85 | 6.49 |
| 1.564791372 | 31.22 | 22.28 | 9.85 | 6.49 |

430

500

600

COMMUNICATION NETWORK RESOURCE ALLOCATION VIA SEGMENTED DEMAND FORECASTING

The present disclosure relates generally to communication network operations, and more specifically to methods, computer-readable media, and apparatuses for configuring a communication network to process data traffic of a first customer via a network resource of a first network resource type that is selected based upon a customer segment of the first customer and an allocation matching scheme in accordance with predicted customer order weights by communication network customer segment and inventory demand weights for network resources of the first network resource type.

BACKGROUND

Manual allocation of network resources to meet subscriber demand may be error prone and result in wastage or redundancy of resources. Similarly, such manual processes may result in unnecessary shortages of resources, unnecessary congestion or bottlenecks, and so forth. For instance, a large communication network may deploy substantial numbers of network elements, such as routers, switches, or the like, to fulfill customer demand for network services. Deployment of new infrastructure may be reactive to increased demand. For instance, new customer demand may be allocated to existing network elements until such resources are deemed full. Then, new network elements may be added to handle additional increases in demand as communication network utilization continues to increase.

SUMMARY

The present disclosure describes methods, computer-readable media, and apparatuses for configuring a communication network to process data traffic of a first customer via a network resource of a first network resource type that is selected based upon a customer segment of the first customer and an allocation matching scheme in accordance with predicted customer order weights by communication network customer segment and inventory demand weights for network resources of the first network resource type. For instance, in one example, a processing system including at least one processor may segregate a plurality of customers of a communication network into a plurality of communication network customer segments in accordance with at least one factor. The processing system may next generate predicted customer order weights by communication network customer segment for a first network resource type in accordance with at least a first forecasting model. The processing system may further calculate a plurality of inventory demand weights for a plurality of network resources of the first network resource type in the communication network in accordance with at least a second forecasting model. The processing system may then obtain a new customer order for the first network resource type from a first customer of the communication network and configure the communication network to process data traffic of the first customer via one of the plurality of network resources of the first network resource type that is selected based upon a customer segment of the first customer and an allocation matching scheme in accordance with the plurality of predicted customer order weights by communication network customer segment and the plurality of inventory demand weights.

BRIEF DESCRIPTION OF THE DRAWINGS

The present disclosure can be readily understood by considering the following detailed description in conjunction with the accompanying drawings, in which:

FIG. 3 illustrates examples of calculating customer order weights by customer segment for several network resource type and examples of calculating inventory demand weights for several network resource types, in accordance with the present disclosure;

To facilitate understanding, identical reference numerals have been used, where possible, to designate identical elements that are common to the figures.

DETAILED DESCRIPTION

Figure 1:
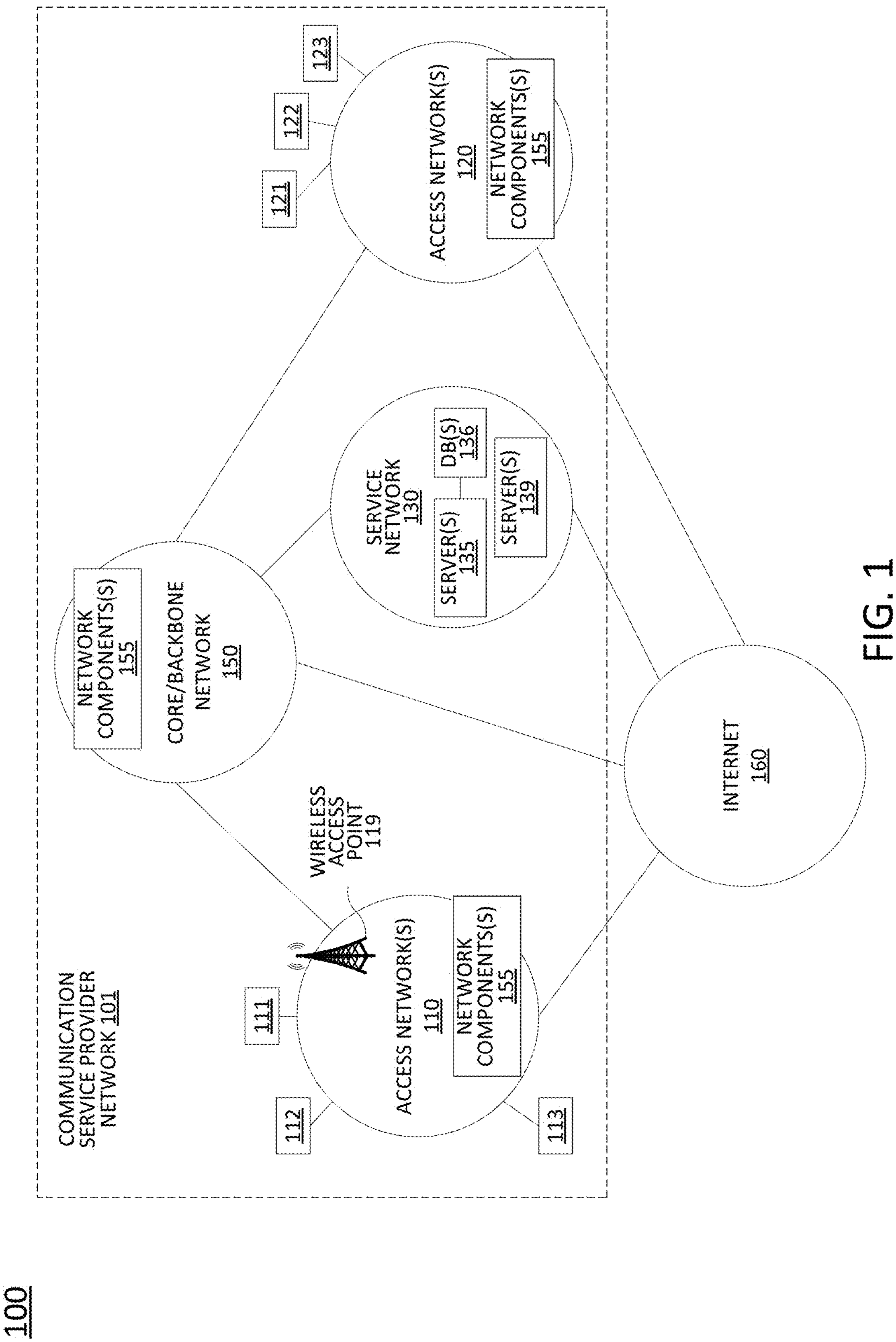
FIG. 1 illustrates an example of a system related to the present disclosure.

The present disclosure broadly discloses methods, non-transitory (i.e., tangible or physical) computer-readable media, and apparatuses for configuring a communication network to process data traffic of a first customer via a network resource of a first network resource type that is selected based upon a customer segment of the first customer and an allocation matching scheme in accordance with predicted customer order weights by communication network customer segment and inventory demand weights for network resources of the first network resource type. In particular, examples of the present disclosure utilize artificial intelligence (AI)/machine learning (ML) for capacity planning and provisioning by providing insights into future network demand along with respective resource sustainability. Examples of the present disclosure load balance and smooth network resource/capacity utilization via prediction, optimization, and automation of customer/subscriber assignments to network resources, thus improving infrastructure usage and avoiding subscriber service disruptions, e.g., through reduced rehoming or the like.

Notably, efficient management of network capacity utilization may be challenging due exponential growth in network utilization, driven in part by technology advancements with fiber rollouts, 5G wireless service expansion, increasing deployment of Internet of things (IoT) devices and systems, and so forth, along with supply chain or other inventory-side issues. Present techniques for capacity planning, allocation, and utilization may be sub-optimal. For instance, current approaches may be reactionary to feedback reports and current network state. In contrast, examples of the present disclosure significantly enhance capacity utilization using AI/ML with broad applicability across multiple domains. To further illustrate, examples of present disclosure may deploy probabilistic inference and AI/ML forecasting/prediction to identify a likelihood of customers of a particular customer type, or segment, who may change connectivity in conjunction with a certain order type. In addition, this may be supplemented by prediction/forecasting of network resource sustainability (e.g., utilization or allocation of subscriber demand/reservation of resources) to provide a robust provisioning methodology.

In one example, the present disclosure may include three components, or phases. For instance, a first phase may be a prediction phase in which a processing system of the present disclosure may predict the ordering pattern in conjunction with customer segments (e.g., customer types). In one example, the forecasting/prediction may identify trends for an area or network zone, such as an office (e.g., a central office (CO)) or geographical region. In addition, the prediction phase may include prediction/forecasting of the availability (or utilization) of network resources (e.g., of a particular network resource type). In an optimization phase, the processing system may deploy allocation/matching logic to prioritize network resources based on demand forecast by customer segment/type and the forecast availability/utilization of network resources of the network resource type. Then, in an automation phase the processing system may obtain a subscriber request for a network resource, and may configure the communication network, e.g., via instructions to one or more network elements and/or to subscriber(s), to process data traffic of the subscriber via a network resource of the network resource type that is selected in accordance with the matching logic. Notably, the assigned network resource may be more likely to sustain the connection throughout future changes based upon the forecasting/prediction of the prior phases, thus avoiding unnecessary rehoming and/or other fallouts related to improper and/or non-optimal allocation.

With improved insight into utilization and ordering patterns in conjunction with respective resources, a network operator may more efficiently plan communication network build-out and procurement of such resources. In addition, underutilization and overutilization of resources may be avoided or reduced via more effective resource allocation. Resource reclamation and subscriber service rehoming may be further reduced, e.g., as a consequence of considering future and relative context via AI/ML forecasting as described herein. Accordingly, examples of the present disclosure more effectively match subscriber demand to available resources, e.g., via load balancing and/or proper distribution of circuits across an office/region through AI/ML-based forecasting and unique matching algorithm as described herein, resulting in more efficient utilization of network resources, reduced wastage due to more accurate procurement schedules, reduced reclamation of unutilized and/or underutilized resources, reduced maintenance windows, and additional benefits to a network operator and subscribers. These and other aspects of the present disclosure are discussed in greater detail below in connection with the examples of FIGS. 1-6.

To aid in understanding the present disclosure, FIG. 1 illustrates an example system 100 comprising a plurality of different networks in which examples of the present disclosure may operate. Communication service provider network 101 may comprise a core network and/or backbone network 150 with components for telephone services, Internet services, and/or video services (e.g., triple-play services, etc.) that are provided to customers (broadly "subscribers"), and to peer networks. In one example, core/backbone network 150 may combine core network components of a cellular network with components of a triple-play service network. For example, communication service provider network 101 may functionally comprise a fixed-mobile convergence (FMC) network, e.g., an IP Multimedia Subsystem (IMS) network. In addition, core/backbone network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Communication service provider network 101 may also further comprise a broadcast video network, e.g., a cable television provider network or an Internet Protocol Television (IPTV) network, as well as an Internet Service Provider (ISP) network. With respect to video/television service provider functions, core/backbone network 150 may include one or more video servers for the delivery of video content, e.g., a broadcast server, a cable head-end, a video-on-demand (VoD) server, and so forth. For example, core/backbone network 150 may comprise a video super hub office, a video hub office and/or a service office/central office.

In one example, access networks 110 and 120 may each comprise a Digital Subscriber Line (DSL) network, a broadband cable access network, a Local Area Network (LAN), a cellular or non-cellular wireless access network, and the like. For example, access networks 110 and 120 may transmit and receive communications between endpoint devices 111-113, endpoint devices 121-123, and service network 130, and between core/backbone network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. In another example, one or both of the access networks 110 and 120 may comprise an ISP network external to communication service provider network 101, such that endpoint devices 111-113 and/or 121-123 may communicate over the Internet 160, without involvement of the communication service provider network 101. Endpoint devices 111-113 and 121-123 may each comprise customer premises equipment (CPE) and/or other endpoint device type, such as a telephone, e.g., for analog or digital telephony, a mobile device, such as a cellular smart phone, a laptop, a tablet computer, etc., a router (e.g., a customer edge (CE) router), a gateway, a desktop computer, a plurality or cluster of such devices, a television (TV), e.g., a "smart" TV, a set-top box (STB).

In one example, the access networks 110 and 120 may be different types of access networks. In another example, the access networks 110 and 120 may be the same type of access network. In one example, one or more of the access networks 110 and 120 may be operated by the same or a different service provider from a service provider operating the communication service provider network 101. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where core/backbone network 150 may provide cellular core network functions, e.g., of a public land mobile network (PLMN)—universal mobile telecommunications system (UMTS)/General Packet Radio Service (GPRS) core network, or the like. For instance, access network(s) 110 may include at least one wireless access point (AP) 119, e.g., a cellular base station, such as an eNodeB, or gNB, a non-cellular wireless access point (AP), such as an Institute of Electrical and Electronics Engineers (IEEE) 802.11 (Wi-Fi) access point, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home or enterprise gateway and/or router, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, communication service provider network 101 may also include one or more network components 155 (e.g., in core/backbone network 150 and/or access network (s) 110 and 120). Network components 155 may include various physical components of communication service provider network 101. For instance, network components 155 may include various types of optical network equipment, such as an optical network terminal (ONT), an optical network unit (ONU), an optical line amplifier (OLA), a fiber distribution panel, a fiber cross connect panel, and so forth. Similarly, network components 155 may include various types of cellular network equipment, such as a mobility management entity (MME), a mobile switching center (MSC), an eNodeB, a gNB, a base station controller (BSC), a baseband unit (BBU), a remote radio head (RRH), an antenna system controller, and so forth. In one example, network components 155 may alternatively or additionally include voice communication components, such as a call server, an echo cancellation system, voicemail equipment, a private branch exchange (PBX), etc., short message service (SMS)/text message infrastructure, such as an SMS gateway, a short message service center (SMSC), or the like, video distribution infrastructure, such as a media server (MS), a video on demand (VoD) server, a content distribution node (CDN), and so forth. Network components 155 may further include various other types of communication network equipment such as a layer 3 router, e.g., a provider edge (PE) router, an integrated services router, etc., an internet exchange point (IXP) switch, and so on. In one example, network components 155 may further include virtual components, such as a virtual machine (VM), a virtual container, etc., software defined network (SDN) nodes, such as a virtual mobility management entity (vMME), a virtual serving gateway (vSGW), a virtual network address translation (NAT) server, a virtual firewall server, or the like, and so forth. In addition, for ease of illustration, various components of communication service provider network 101 are omitted from FIG. 1.

In accordance with the present disclosure, network components 155 may comprise "network resources" of various network resource types, e.g., "routers," "switches," PBX, IoT management console, etc. In accordance with the present disclosure, network resources may also include services provided and/or hosted via network components 155, e.g., enterprise communication services, such as a virtual private network (VPN) service, a virtual local area network (VLAN) service, a Voice over Internet Protocol (VoIP), a software defined-wide area network (SD-WAN) service, an Ethernet wide area network E-WAN service, and so forth. Alternatively, or in addition, network resources may include interfaces or ports associated with such services, such as a customer edge (CE) router or PBX-to-time division multiplexing (TDM) gateway interface, a Border Gateway Protocol (BGP) interface (e.g., between BGP peers), and so forth. For instance, a CE router, PBX, or the like may be homed to one or several provider edge (PE) routers or other edge component(s).

In one example, the service network 130 may comprise a local area network (LAN), or a distributed network connected through permanent virtual circuits (PVCs), virtual private networks (VPNs), and the like for providing data and voice communications. In one example, the service network 130 may comprise one or more devices for providing services to subscribers, customers, and/or users. For example, communication service provider network 101 may provide a cloud storage service, web server hosting, and other services. As such, service network 130 may represent aspects of communication service provider network 101 where infrastructure for supporting such services may be deployed. In one example, the service network 130 may alternatively or additionally comprise one or more devices supporting operations and management of communication service provider network 101. For instance, in the example of FIG. 1, server(s) 139 may include higher level services/applications such as a database of assigned telephone numbers, a database of basic customer account information for all or a portion of the customers/subscribers of the communication service provider network 101, a billing system, a customer relationship management (CRM) system, a trouble ticket system, an ordering system, an enterprise reporting system (ERS), an account object (AO) database system, a network inventory system, a network provisioning system, and so forth.

In addition, service network 130 may include one or more servers 135 which may each comprise all or a portion of a computing device or system, such as computing system 600, and/or processing system 602 as described in connection with FIG. 6 below, specifically configured to perform various steps, functions, and/or operations for configuring a communication network to process data traffic of a first customer via a network resource of a first network resource type that is selected based upon a customer segment of the first customer and an allocation matching scheme in accordance with predicted customer order weights by communication network customer segment and inventory demand weights for network resources of the first network resource type, as described herein. For example, one of the server(s)

135, or a plurality of servers 135 collectively, may perform operations in connection with the example method 500, or as otherwise described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 6 and discussed below) or multiple computing devices collectively configured to perform various steps, functions, and/or operations in accordance with the present disclosure.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in connection with examples of the present disclosure. For example, DB(s) 136 may be configured to receive and store network resources information, including information on the type(s) of network resources, utilization and/or availability levels of such network resources, and so forth. It should be noted that some or all of such information may be contained in other network databases/systems, such as one or more of an active and available inventory (A&AI) database, a network inventory database, or the like. Alternatively, or in addition, DB(s) 136 may be configured to receive and store customer/subscriber network resource order information, such as the subscriber/customer identities and other characteristics (e.g., a customer intensity value and/or a customer segment as described herein), the timing of such orders, the quantities of such orders, the type of service(s) ordered, and so forth. Similar to the above, some or all of such information may be contained in other network databases/systems, such as one or more of an authentication, authorization, and accounting (AAA) server/system, an operations support system (OSS), a business support system (BSS), a unified data repository (UDR), or the like.

It should be noted that in accordance with the present disclosure, the network resources information and the customer/subscriber network resource order information stored in DB(s) 136 or elsewhere may be maintained over a period of time. For instance, DB(s) 136 may store respective time series data indicative of respective numbers of customer orders for different network resource types in a given time interval (and over a period of a plurality of time intervals), different utilization and/or assignment levels of various network resources of various types in a given time interval (and over a period of a plurality of time intervals), etc. In one example, different time series of the same or similar nature may be collected and stored with respect to different customer segments.

In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like. In one example, the one or more of the servers 135 and/or server(s) 135 in conjunction with DB(s) 136 may comprise a communication network service provisioning platform (e.g., a network-based and/or cloud-based service hosted on the hardware of server(s) 135 and/or DB(s) 136).

Figure 5:
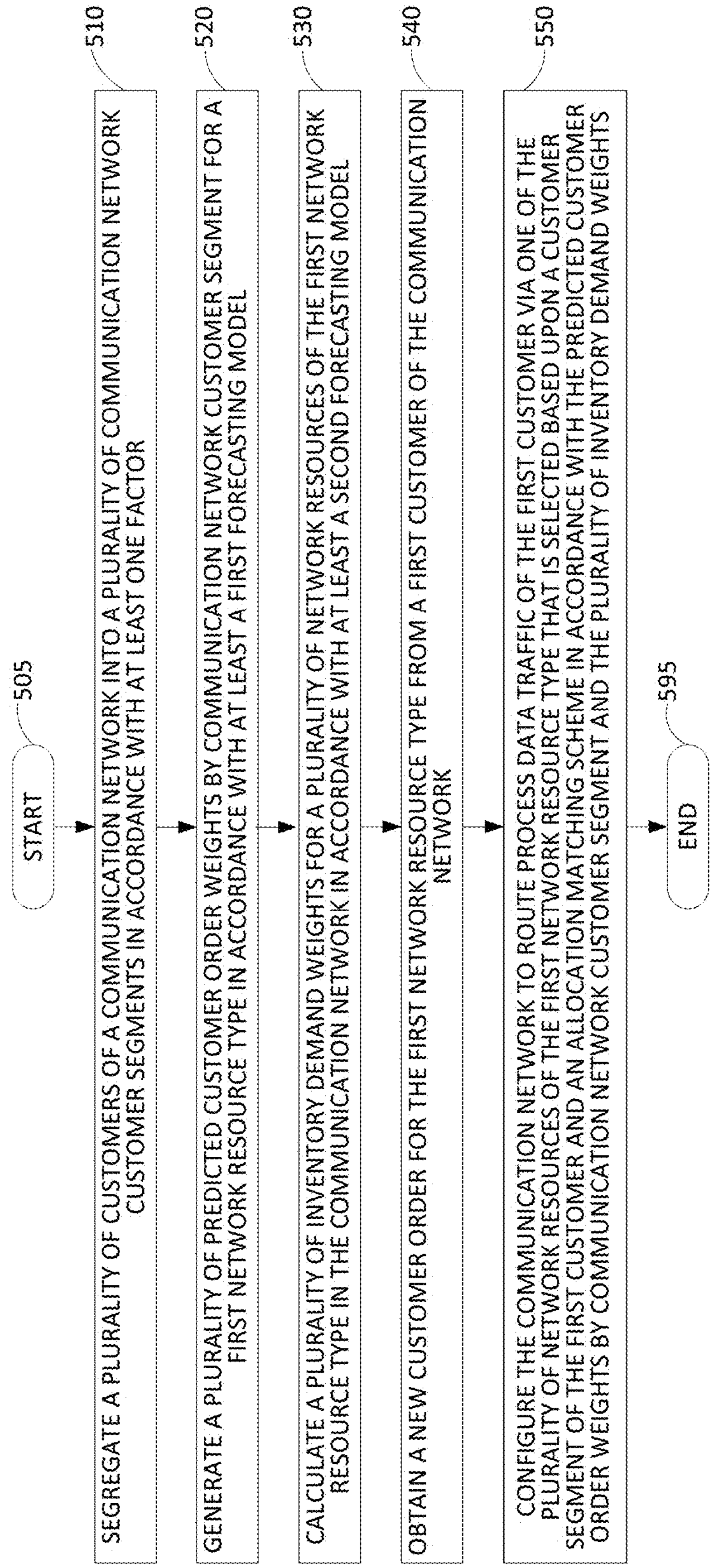
FIG. 5 illustrates an example flowchart of a method for configuring a communication network to process data traffic of a first customer via a network resource of a first network resource type that is selected based upon a customer segment of the first customer and an allocation matching scheme in accordance with predicted customer order weights by communication network customer segment and inventory demand weights for network resources of the first network resource type.

As noted above, server(s) 135 may be configured to perform various steps, functions, and/or operations for configuring a communication network to process data traffic of a first customer via a network resource of a first network resource type that is selected based upon a customer segment of the first customer and an allocation matching scheme in accordance with predicted customer order weights by communication network customer segment and inventory demand weights for network resources of the first network resource type, as described herein. For instance, an example method for configuring a communication network to process data traffic of a first customer via a network resource of a first network resource type that is selected based upon a customer segment of the first customer and an allocation matching scheme in accordance with predicted customer order weights by communication network customer segment and inventory demand weights for network resources of the first network resource type is illustrated in FIG. 5 and described in greater detail below. To further illustrate, server(s) 135 may segregate a plurality of customers/subscribers into customer segments in accordance with at least one factor, such as a customer type, a customer intensity, and so forth. Server(s) 135 may next generate a plurality of predicted customer order weights by communication network customer segment for a first network resource type in accordance with at least a first forecasting model. In one example, the foregoing may be based upon customer/subscriber data and order history data of DB(s) 136 and/or from one or more other data repositories of communication network 101. In addition, server(s) 135 may calculate a plurality of inventory demand weights for a plurality of network resources of the first network resource type in the communication network in accordance with at least a second forecasting model. In one example, this may be based upon network resource data and order history data of DB(s) 136 and/or from one or more other data repositories of communication network 101. Server(s) 135 may then obtain a new customer order for the first network resource type from a first customer of the communication network. For instance, the order may be obtained from one of the endpoint devices 111-113 or 121-123. The order may identify the first network resource type directly, or may be for a service that is supported by the first network resource type (e.g., a VPN traversing a provider edge router, an internal router node, etc.). In response, server(s) 135 may assign the new customer order to one of the plurality of network resources based upon a customer segment of the first customer and an allocation matching scheme in accordance with the predicted customer order weights by communication network customer segment and the plurality of inventory demand weights.

To illustrate, the allocation matching scheme may assign new customer orders to network resources of the first network resource type by inversely matching predicted customer order weights by communication network segment for the first network resource type to inventory demand weights of the plurality of network resources of the first network resource type. For example, preferentially, new orders from customers in the customer segment having the highest predicted customer order weight may be assigned to the network resource of the first network resource type with the lowest inventory demand weight. New orders from customers in the customer segment having the second highest predicted customer order weight may be assigned to the network resource of the first network resource type with the second lowest inventory demand weight. New orders from customers in the customer segment having the lowest predicted customer order weight may be assigned to the network resource of the first network resource type with the highest inventory demand weight, and so forth.

Server(s) 135 may then configure the communication network to process data traffic of the first customer via the one of the plurality of network resources of the first network resource type that is selected. For instance, server(s) 135 may transmit instructions to one or more of network component(s) 155 and/or to one or more customer devices (e.g., one or more of endpoint devices 111-113 and/or endpoint devices 121-123) to process data traffic of the customer via the one of the plurality of network resources of the first network resource type that is selected. For instance, server (s) 135 may establish a BGP link via instructions to one or both of a PE router and a CE router identifying the respective peers and/or other parameters of the link. In one example, server(s) 135 may repeat one or more of: customer segmenting, predicting of customer order weights by communication network customer segment for one or more network resource types, or calculating inventory demand weights for various network resources of the first network resource type and/or of other network resource types. Thus, for example, subsequent new customer orders may be allocated differently by the allocation matching scheme in accordance with the updated customer order weights and/or inventory demand weights. Servers(s) 135 may alternatively or additionally perform various operations as described in connection with FIGS. 2-5, or elsewhere herein.

In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in core/backbone network 150, and so forth. Thus, these and other modifications are all contemplated within the scope of the present disclosure.

Figure 2:
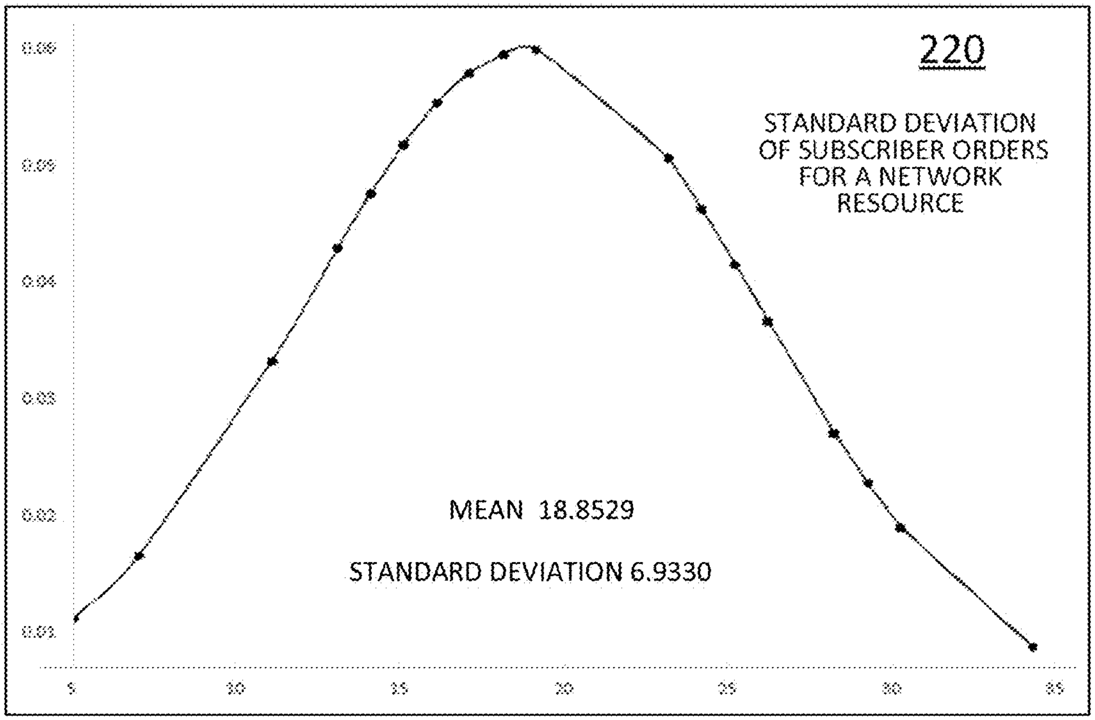
FIG. 2 illustrates an example of a distribution of subscriber orders, a standard deviation graph illustrating a mean number of orders, and an example of customer segmenting in accordance with multiple factors, in accordance with the present disclosure.

FIG. 2 illustrates an example of a distribution of subscriber orders, in accordance with the present disclosure. In particular, FIG. 2 illustrates a first example table 210 of customers, the customers' add/change orders (e.g., in a given time period, such as within a one month time period, a three month time period, or the like), and a corresponding normal distribution of the orders. For instance, the add/change orders may be for orders relating to a particular type of network resource. FIG. 2 further illustrates a standard deviation graph 220 illustrating a mean number of orders (e.g., including add and change orders) of 18.8529 and a standard deviation of 6.9330. In one example, customers/subscribers may be segmented in accordance with such a distribution and the standard deviation. For instance, customers/subscribers may be categorized into four segments in accordance with the mean and the standard deviation. To illustrate, four segments are indicated via the overlay on the first example table 210. Segment 2 may comprise customers having order numbers from the mean to one standard deviation below the mean. Segment 1 may comprise customers having order numbers below the one standard deviation. Segment 3 may comprise customers having order numbers from the mean to one standard deviation above the mean. Segment 4 may comprise customers having order numbers above the one standard deviation.

FIG. 2 further illustrates a second example table 230 which contains customer segmenting in accordance with multiple factors (e.g., orders for different types of network resources, which may include circuits, VoIP services, VPN, and VLAN). For instance, a total weighted order count may be indicated in the "Total" column, and may be computed based upon a weighted sum of the orders for the respective network resources (e.g., using the factor weights 235). It should be noted that in various examples, other factors may be used for customer segmenting, such as number of orders for Border Gateway Protocol (BGP) service, a number of orders for a cloud firewall service, etc. Similarly, different factor weights may be used for various factors in various other examples.

In one example, the totals may then be used to segregate the customers/subscribers into customer segments or "intensities" (e.g., intensity 1-intensity 4). In this regard, it should be noted that the intensities/customer segments may be defined in accordance with a normal distribution and standard deviation of the values form the "Total" column. However, in another example, the intensities/segments may be assigned in a different manner, such as generating segments with equal numbers of customer according to the rank/order of values in the "Total" column (or substantially equal size segments if there are an odd number of customers and an even number of target segments, or the like). It should be noted that in one example, the customer segments illustrated with respect to the first example table 210 may also be segregated in the same or similar manner (e.g., instead of using the mean and standard deviation). Other variations of a same or similar nature may also be utilized in various example, such as using the median, using the mean and standard deviation, but then adjusting to add and/or subtract customers from segments if any segment has less than a threshold number of customers, less than a threshold percentage of the total number of customers under consideration, and so forth. Thus, these and other modifications are all contemplated within the scope of the present disclosure.

To further aid in understanding the present disclosure, FIG. 3 illustrates examples of calculating customer order weights by customer segment for several network resource types, e.g., gigabit Ethernet (GigE) VPN, 10 GigE VPN, and 100 GigE VPN) and examples of calculating inventory demand weights for several network resource types (e.g., GigE, 10 GigE, and 100 GigE interfaces of several routers) in accordance with the present disclosure. For instance, table 310 illustrates a total number of order counts for each interface type (e.g., a "service type count" column) for each of a plurality of customer segments. For instance, there may be four segments (1 through 4), which may be identified in a manner such as described in connection with the examples of FIG. 2, or elsewhere herein. In addition, table 410 illustrates a column for "total category count" associated with each interface type for each of the customer segments. For example, this may indicate the total number of orders for VPN services across all three interface types for a given segment. In the present example, the "total" column indicates a customer order weight by customer segment for each network resource type. For instance, the customer order weight by customer segment for a given network resource type may be computed based upon three factors (e.g., "total category count," "service type count," and "segment") and the factor weights 315 as indicated. For example, for GigE VPN for customer segment 1, the total may be computed as 0.2*138+0.4*114+0.4*1=73.6, and so forth for other customer segments and for the other interface types. It should be noted that the values for "total category count" and "service type count" illustrated in FIG. 3 are partially repetitive for each customer segment and for the different interface types. Thus, the values in the "total" column demonstrate the effects of variations in a single input factor on the customer order weight by customer segment for each network resource type. For instance, even with the same total category count and service type count, the customer order weight for GigE VPN for segment 1 would be 73.6 while the customer order weight for GigE VPN for segment 2 would be 74. However, it should be expected that similar data from actual network measurements may exhibit more variation among the segments.

It should also be noted that table 310 may comprise total category counts and service type counts for a particular time period (e.g., the week of Dec. 3, 2023 to Dec. 9, 2023). In this regard, examples of the present disclosure may gather and store data of the same or a similar nature over a larger time block comprising a plurality of historical time periods. For instance, table 320 illustrates the customer order weight by customer segment for each network resource type (e.g., which may correspond to the "total" column of table 310) over successive time periods T-1, T-2, T-3, . . . , T-N, etc. However, it should be noted that the values in table 320 may not correspond directly to those of table 310, but are provided for illustrative purposes only. Notably, the data of table 320 may comprise a time series of historical customer order weights by communication network customer segment for 100 G (e.g., 100 GigE) 10 G (e.g., 10 GigE), and 1 G (e.g., GigE) VPN, illustrated by 325 in FIG. 3. This time series 325 may then be used for forecasting/prediction of customer order weights by communication network customer segment for one or more network resource types for one or more future time periods, which may be used for new customer order-to-network resource mappings in the communication network.

FIG. 3 illustrates an additional table 330 which contains inventory demand weights for several network resources (e.g., GigE, 10 GigE, and 100 GigE interfaces of several routers), e.g., in the "total" column. For instance, each row contains for a given network resource over a given time period (e.g., the week of Dec. 3, 2023 to Dec. 9, 2023) various utilization metrics (e.g., bandwidth (BW) percent used, VRF (virtual routing and forwarding) percent used, VLAN percent used, and Border Gateway Protocol (BGP) percent used) and a total inventory demand weight that is based upon the plurality of utilization metrics as input factors and a plurality of factor weights 335. To illustrate, for GigE on router 1 the total (e.g., the inventory demand weight) may be computed as 0.3*34+0.15*0+0.2*0+0.35*23=18.25, and so forth for the other example network resources in table 330. Similar to the foregoing, examples of the present disclosure may gather and store data of the same or a similar nature over a larger time block comprising a plurality of historical time periods (e.g., time periods T-1, T-2, T-3, . . . , T-N, etc.). In addition, such data may comprise a time series of inventory demand weights, illustrated by 355 in FIG. 3. This time series 355 may then be used for forecasting/prediction of inventory demand weights for one or more of the network resources for one or more future time periods, which may be used for new customer order-to-network resource mappings in the communication network.

To illustrate, examples of the present disclosure may predict/forecast customer order weights by communication network customer segment for one or more network resource types for one or more future time periods and may also forecast/predict inventory demand weights for one or more of the network resources for one or more future time periods. For instance, in accordance with the present disclosure, predicting/forecasting may be in accordance with one or more artificial intelligence (AI) algorithms and/or machine learning algorithms (MLAs), e.g., one or more trained machine learning models (MLMs). For instance, a machine learning algorithm (MLA), or machine learning model (MLM) trained via a MLA may comprise a deep learning neural network, or deep neural network (DNN), a generative adversarial network (GAN), a decision tree algorithms/models, such as gradient boosted decision tree (GBDT) (e.g., XGBoost, or the like), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. For instance, a separation hyperplane may segregate categories of "high demand" and "low demand" for a given customer segment for a given network resource type. Accordingly, a distance from a separation hyperplane of a binary classifier may be scaled to a forecast customer order weight for a customer segment for a particular network resource type at a given future time period for which the classifier provides such prediction. Similarly, a separation hyperplane may segregate categories of "busy" and "not busy" for a given network resource, and a distance from such a separation hyperplane of a binary classifier may be scaled to a forecast inventory demand weight for a particular network resource at a given future time period for which the classifier provides such prediction.

In one example, customer order weights by communication network customer segment for one or more network resource types for one or more future time periods and/or inventory demand weights for one or more of the network resources for one or more future time periods may be forecast/predicted using one or more time series prediction/forecasting model, e.g., based upon historical data such as described and illustrated in connection with FIG. 3, such as a moving average (MA) model, an autoregressive distributed lag (ADL) model, an autoregressive integrated moving average (ARIMA) model, a seasonal ARIMA (SARIMA) model, or the like. Similarly, other regression-based models may be trained and used for such prediction/forecasting, such as logistic regression, polynomial regression, ridge regression, lasso regression, etc. In one example, the present disclosure may predict/forecast using multiple factors as predictors (e.g., covariates, or exogenous factors). For instance, a seasonal auto-regressive integrated moving average with exogenous factors (SARIMAX) model may be used. Alternatively, a vector auto-regression (VAR), or VAR moving average (VARMA) model may be used. Similarly, a vector auto-regression moving-average with exogenous factors/regressors (VARMAX) model may be applied.

In one example, an MLM for forecasting customer order weights by communication network customer segment for one or more network resource types for one or more future time periods and/or forecasting inventory demand weights for one or more of the network resources for one or more future time periods may comprise a recurrent neural network (RNN), a long-short term memory (LSTM) neural network, or the like. For instance, RNNs and LSTMs may be trained on and make predictions with respect to time series data. In another example, an MLM of the present disclosure may comprise a convolutional neural network (CNN) that is suitable for time series data, such as an AlexNet or WaveNet. In still another example, an MLM for forecasting customer order weights by communication network customer segment for one or more network resource types for one or more future time periods and/or forecasting inventory demand weights for one or more of the network resources for one or more future time periods may comprise a gradient boosted machine (GBM), such as a light GBM. It should be noted that in one example, forecasting/prediction may be for a total category count and a service type count, respectively, e.g., rather than predicting/forecasting the customer order weight by customer segment for a network resource type directly, where the forecast value may be generated from the predicted values, e.g., via a weighted combination in accordance with factor weights 315, or the like. Similarly, forecasting/prediction may be via respective models for BW percent used, VRF percent used, etc., rather than direct prediction of inventory demand weight. Thus, these and other modification are all contemplated within the scope of the present disclosure.

Figure 4:
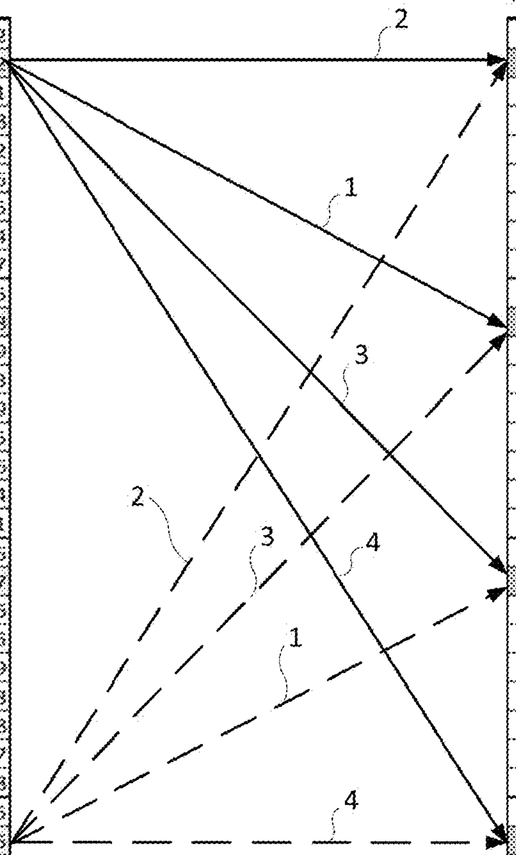
FIG. 4 illustrates an example of network service provisioning optimization in accordance with allocation/matching logic to prioritize allocation of network resources based on demand forecast by customer segment/type and the forecast availability/utilization of network resources of a network resource type, in accordance with the present disclosure.

FIG. 4 illustrates an example of network service provisioning optimization in accordance with allocation/matching logic to prioritize allocation of network resources based on demand forecast by customer segment/type and the forecast availability/utilization of network resources of the network resource type. For instance, an allocation matching scheme may assign new customer orders to network resources of the given network resource type by inversely matching predicted customer order weights by communication network segment for the network resource type to inventory demand weights of a plurality of network resources of the given network resource type. In other words, new orders from customers in a customer segment having the highest predicted customer order weight may preferentially be allocated a network resource of the network resource type with a lowest inventory demand weight. In addition, new orders from customers in a customer segment having the second highest predicted customer order weight may be assigned to a network resource of the network resource type with the second lowest inventory demand weight. On the other hand, new orders from customers in the customer segment having the lowest predicted customer order weight may be assigned to a network resource of the network resource type with a highest inventory demand weight, and so forth.

For instance, in the example of FIG. 4, table 410 illustrates predicted customer order weights by communication network customer segment for one or more network resource types for one or more future time periods. It should be noted that the class column may indicate the particular category, or class of network resource. For instance, the resource types may be 1 GigE, 10 GigE, and 100 GigE, where the class type is VPN for all of these resource types. In addition, FIG. 4 illustrates a second example table 420 containing predicted inventory demand weights (which may also be referred to as "sustainability weights") for several network resources (e.g., indicated by element identifier (ID)) for the one or more future time periods. In one example, the future time period of the month ending on Dec. 28, 2022 may be selected for allocation matching for customer orders relating to a 10 GigE VPN service. In this case, there are four predicted customer order weights for the 10 GigE VPN service, e.g., one for each customer segment, having the values of 1.5648, 1.6570, 1.6724, and 1.6719, respectively. In the example of FIG. 4, there are also four 10 GigE network resources that are potentially available for allocation/assignment, and hence four inventory demand/sustainability weights for the same time period. In this example, customer segment 1 has the lowest predicted customer order weight by customer segment for the network resource type (1.5648). As such, the order of preference for allocation to network resources may be from highest inventory demand weight to lowest. For instance, although the 10 GigE interface for element ID 54819 is predicted to have the most demand (e.g., the most utilization in the month ending Dec. 28, 2023, having a value of 31.2223) new traffic from customers in segment 1 may impact the load of the network element and/or the interface thereof less than that of customers in segment 3 or 4, for example.

On the other hand, customer segment 3 has the highest predicted customer order weight by customer segment for the network resource type (having a value of 1.6724). As such, the order of preference for allocation to network resources may be from lowest inventory demand weight (e.g., the most underutilized) to highest. For instance, the 10 GigE interface for element ID 111656 is predicted to have the least demand (e.g., the least utilized in the month ending Dec. 28, 2023, having a value of 6.45). Thus, new orders from customers in segment 3 may be preferentially assigned to the 10 GigE interface of element ID 111656. Conversely, new orders from customers in segment 3 may be assigned to the 10 GigE interface of element ID 54819 with least preference. In this regard, table 430 illustrates example allocation preferences for each customer segment (keyed by weight) to each available network resource of the particular type. FIG. 4 further illustrates arrows from rows in table 410 to rows in table 420 corresponding to the order of preference of assignment for customer segment 1 and customer segment 4 (which are the same as contained in table 430). It should be noted that for customer segments intermediate between highest and lowest may be allocated as shown in table 430. However, other, further, and different examples may use a different preference order for the $2^{nd}$, $3^{rd}$, and $4^{th}$ preferred network resources for such intermediate ranked segments. In addition, although FIG. 4 illustrates an example in which there are four customer segments and four available network resources of the network element type, in other examples, there may be more or less customer segments, more or less available network resources of the given type, and so forth. In addition, in one example, there may be different numbers of customer segments and available network resources. For example, there may be five customer segments and ten available network resources of the network resource type. In one example, the future time period used for allocation/matching may be tuned based upon empirical feedback results over an extended period of time. For instance, a reinforcement learning (RL) process may be applied to adjust how far into the future the forecasting/prediction may be used for allocation/matching of new, current orders to network resources, e.g., based upon one or more objective criteria, such as balancing utilization among existing network resources of a given type, minimizing the deployment of new resources, minimizing the occurrence of overload condition on a device or link, minimizing the number of complaints, and so forth. Thus, these and other modification are all contemplated within the scope of the present disclosure.

FIG. 5 illustrates a flowchart of an example method 500 for configuring a communication network to process data traffic of a first customer via a network resource of a first network resource type that is selected based upon a customer segment of the first customer and an allocation matching scheme in accordance with predicted customer order weights by communication network customer segment and inventory demand weights for network resources of the first network resource type. In one example, steps, functions, and/or operations of the method 500 may be performed by a device as illustrated in FIG. 1, e.g., one or more of the servers 135, or the like. Alternatively, or in addition, the steps, functions and/or operations of the method 500 may be performed by a processing system collectively comprising a plurality of devices as illustrated in FIG. 1 such as one or more of the servers 135, DB(s) 136, endpoint devices 111-113 and/or 121-123, and so forth. In one example, the steps, functions, or operations of method 500 may be performed by a computing device or system 600, and/or a processing system 602 as described in connection with FIG. 6 below. For instance, the computing device 600 may represent at least a portion of a platform, a server, a system, and so forth, in accordance with the present disclosure. For illustrative purposes, the method 500 is described in greater detail below in connection with an example performed by a processing system. The method 500 begins in step 505 and proceeds to step 510.

At step 510, the processing system segregates a plurality of customers of a communication network into a plurality of communication network customer segments in accordance with at least one factor. In one example, the segregating may include segregating the plurality of customers by customer intensity values. For instance, as described above in connection with the example(s) of FIG. 2, each customer intensity value may be calculated based upon counts of a number of network services utilized by a respective customer. To further illustrate, step 510 may comprise segregating the plurality of customers into the plurality of communication network customer segments in accordance with a distribution of values of the at least one factor associated with the plurality of customers. The at least one factor may include a circuit order count, a VoIP order count, a VPN order count, a VLAN order count, and/or other factors of the same or similar nature. In another example, the segregating may be in accordance with another factor, such as customer type, e.g., by industry. For example, customers/subscribers may be assigned to respective segments for "educational," "manufacturing," "healthcare," "governmental," "entertainment," "hospitality," "banking," "retail," etc. for categories of a different granularity (e.g., primary education, kindergarten and pre-kindergarten, secondary education, etc.). In still other examples, customers/subscribers may be alternatively or additionally segmented by region/geographic groups, or other factors.

At step 520, the processing system generates a plurality of predicted customer order weights by communication network customer segment for a first network resource type in accordance with at least a first forecasting model. In one example, the at least the first forecasting model may comprise at least a first time series forecasting model, e.g., a regression model, a gradient boosted machine (GBM), etc. In one example, the at least the first forecasting model may be trained with a training data set comprising historical order data for at least a portion of the plurality of customers of the plurality of customer segments. In one example, there may be different models trained for different customer segments and thus use different training data sets for the respective customer segments. In one example, there may be different models for different network resource types (e.g., a GigE VPN model, a 10 GigE VPN model, etc.). In one example, each of the plurality of predicted customer order weights by communication network customer segment may be based upon an order count for the first network resource type by a subset of the plurality of customers of a particular customer segment. For instance, the order count may be a plurality of historical order counts over plurality of historical time periods comprising a time series data set (e.g., a univariate or multivariate time series).

In one example, each of the plurality of predicted customer order weights by communication network customer segment may be further based upon an order count for a network resource category including a plurality of network resource types including the first network resource type by the subset of the plurality of customers of the particular customer segment (e.g. 1 GigE, 10 GigE, and/or 100 GigE VPN, such as in the example(s) of FIG. 3 and/or FIG. 4, or the like). In one example, each of the plurality of predicted customer order weights by communication network customer segment may be further based upon a factor associated with a customer segment (e.g., a weighted customer intensity value (such as illustrated in table 310 of FIG. 3). As also noted above, in one example, there may be a single prediction model for "predicted customer order weights by communication network customer segment" or there may be respective models for (a) a first network resource type predicted order count for customer segment and (b) a network resource category predicted order count by the customer segment, which may then be combined, e.g., as illustrated in the example of FIG. 3, or the like. It should again be noted that in accordance with the present disclosure, the first network resource type may comprise a physical network element type (e.g., a router, a switch, a firewall, etc.), a virtual network element type (e.g., a virtual PE router, etc.), or a network interface type (e.g., a 10 GigE interface, a 100 GigE interface, etc.). In still another example, the first network resource type may include a hardware capacity or a network path/link capacity (e.g., for orders requesting processor, memory, or storage allocation, bandwidth allocation, or the like). In this regard, it should be noted that examples of the present disclosure may also be applied at different levels of granularity, such as "bandwidth" versus the more detailed: GigE VPN, 10 GigE VPN, 100 GigE VPN, etc.

At step 530, the processing system calculates a plurality of inventory demand weights for a plurality of network resources of the first network resource type in the communication network in accordance with at least a second forecasting model. Similar to the above, the at least the first forecasting model may comprise at least a first time series forecasting model, e.g., a regression model, a GBM, etc. In one example, the at least the second forecasting model may be trained with a training data set comprising historical allocations associated with the plurality of network resources, e.g., a percentage/quantity of allocations. In one example, the historical allocations may be across the plurality of communication network customer segments. In another example, the at least the second forecasting model may be trained with a training data set comprising historical utilization measures associated with the plurality of network resources (e.g., percentage/quantity of utilization as an alternative or in addition to percentage/quantity of allocation). In such an example, the historical utilization measures may also be across the plurality of communication network customer segments.

In one example, there may be different time series for each network resource, and hence different "second" forecasting models. In one example, each network resource of the plurality of network resources may be a different network element. Alternatively, or in addition, in one example, each network resource may be associated with a different network element, such as 10 GigE interfaces of different routers, or the like. In one example, the training data set may include percent/quantity of allocations for one or more interfaces/services of a network element associated with an instance of the first network resource type (e.g., a router with a 10 GigE interface, where the network element may also have a 1 GigE interface, a 100 GigE interface, etc.). In one example, the training data may further indicate allocations for various other network resource categories for the same or different interface types, e.g., VPN, BGP, VLAN, bandwidth, etc.

In one example, the at least the second forecasting model may include a respective forecasting model for the one of the plurality of network resources, where the respective forecasting model comprises a plurality of input factors for a plurality of network resource types associated with a network element type, the plurality of network resource types including the first network resource type of the one of the plurality of network resources, where the one of the plurality of network resources is associated with a network element of the network element type. For example, as illustrated in table 330 of FIG. 3, inventory weight may be for a given network resource (e.g., an interface of a particular interface type), but may be calculated based upon predictions for multiple different interfaces of different types on the same network element (e.g., a router, or the like). As noted above, in one example, a single model for each network resource may be trained to predict inventory demand weight. However, in another example, for each network resource, there may be different models that predict VRF percent used, BGP percent used, etc., where an inventory demand weight is then calculated based upon a weighted sum of different model outputs.

At step 540, the processing system obtains a new customer order for the first network resource type from a first customer of the communication network. For instance, step 540 may include identifying the customer segment of the new customer, such as illustrated in FIG. 2, and/or via a different segmenting/categorization criteria (e.g., by customer type/industry, by geographic region, etc.).

At step 550, the processing system configures the communication network to process data traffic of the first customer via one of the plurality of network resources of the first network resource type that is selected based upon a customer segment of the first customer and an allocation matching scheme in accordance with the predicted customer order weights by communication network customer segment and the plurality of inventory demand weights. For instance, step 550 may include assigning the new customer order to the one of the plurality of network resources based upon the customer segment of the first customer via the allocation matching scheme in accordance with the predicted customer order weights by communication network customer segment and the plurality of inventory demand weights. For example, the allocation matching scheme may include the processing system assigning new customer orders to network resources of the first network resource type by inversely matching predicted customer order weights by communication network segment for the first network resource type to inventory demand weights of the plurality of network resources of the first network resource type.

To further illustrate, new orders from customers in the customer segment having the highest predicted customer order weight may be preferentially assigned to the network resource of the first network resource type with the lowest inventory demand weight. New orders from customers in the customer segment having the second highest predicted customer order weight may be assigned to the network resource of the first network resource type with the second lowest inventory demand weight. New orders from customers in the customer segment having the lowest predicted customer order weight may be assigned to the network resource of the first network resource type with the highest inventory demand weight, and so forth. In one example, step 550 may include transmitting instructions to one or more of network component(s) and/or to one or more customer/subscriber devices (e.g., a CE router, a customer gateway, etc.) to process data traffic of the customer via the one of the plurality of network resources of the first network resource type that is selected. For instance, the processing system may establish a VLAN service via instructions to one or both of a PE router and a CE router identifying the respective peers and/or other parameters for conveying the VLAN traffic of the customer between such elements. In one example, step 550 may include providing recommendations to a software defined network (SDN) controller, which may send instructions to one or more network elements and/or customer devices to configure in accordance with the selected allocation.

Following step 550, the method 500 ends in step 595. It should be noted that method 500 may be expanded to include additional steps, or may be modified to replace steps with different steps, to combine steps, to omit steps, to perform steps in a different order, and so forth. For instance, in one example, the processing system may repeat one or more steps of the method 500, such as steps 540-550 for new customer orders, steps 520-550 for additional network resource types, steps 520-550 for additional forecast time periods (e.g., as new historical data is obtained and as successive future time periods may be accurately forecast), and so forth. In one example, the method 500 may include a step of generating the allocation matching scheme based upon the predicted customer order weights by communication network customer segment and the plurality of inventory demand weights, e.g., following step 530. In one example, step 520 may include or may be preceded by a step of collecting and/or obtaining historical data. In one example, the method 500 may be expanded or modified to include steps, functions, and/or operations, or other features described above in connection with the example(s) of FIGS. 1-4, or as described elsewhere herein. Thus, these and other modifications are all contemplated within the scope of the present disclosure.

In addition, although not specifically specified, one or more steps, functions, or operations of the method 500 may include a storing, displaying, and/or outputting step as required for a particular application. In other words, any data, records, fields, and/or intermediate results discussed in the method 500 can be stored, displayed and/or outputted either on the device executing the method 500, or to another device, as required for a particular application. Furthermore, steps, blocks, functions, or operations in FIG. 5 that recite a determining operation or involve a decision do not necessarily require that both branches of the determining operation be practiced. In other words, one of the branches of the determining operation can be deemed as an optional step. In addition, one or more steps, blocks, functions, or operations of the above described method 500 may comprise optional steps, or can be combined, separated, and/or performed in a different order from that described above, without departing from the examples of the present disclosure.

Figure 6:
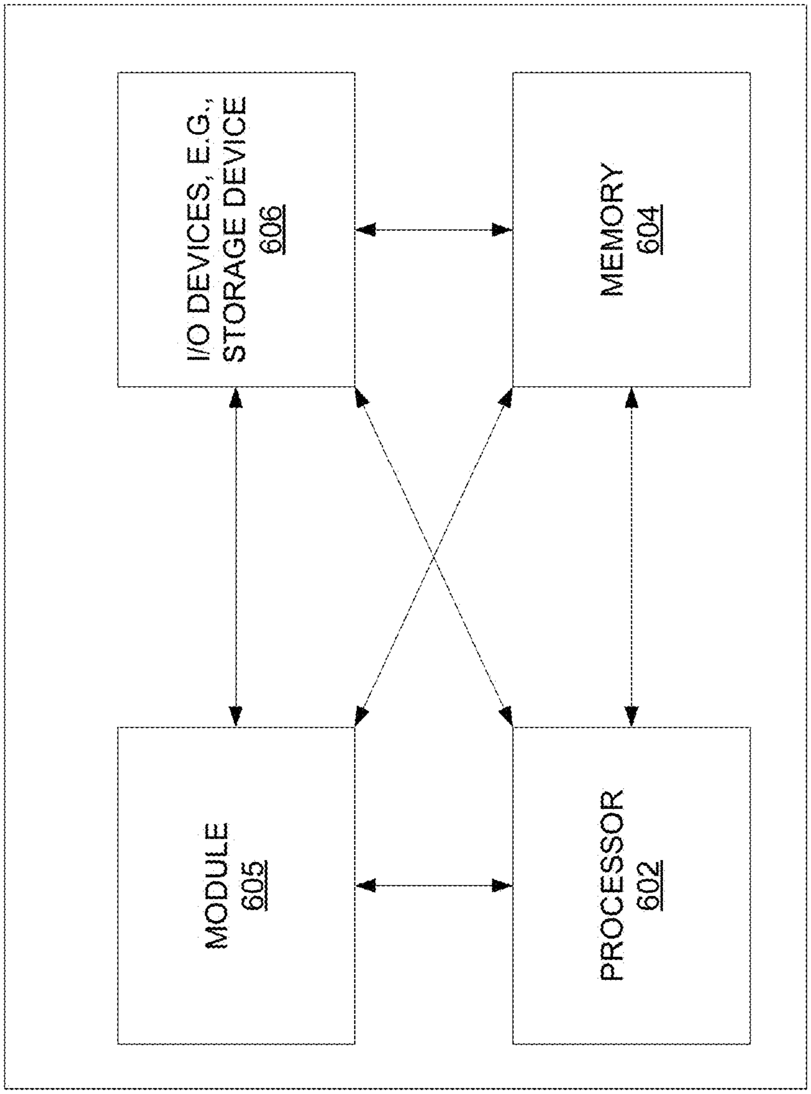
FIG. 6 illustrates a high-level block diagram of a computing device specially programmed to perform the functions described herein.

FIG. 6 depicts a high-level block diagram of a computing device or processing system specifically programmed to perform the functions described herein. For example, any one or more components or devices illustrated in FIG. 1, or described in connection with the examples of FIGS. 2-5 may be implemented as the processing system 600. As depicted in FIG. 6, the processing system 600 comprises one or more hardware processor elements 602 (e.g., a microprocessor, a central processing unit (CPU) and the like), a memory 604, (e.g., random access memory (RAM), read only memory (ROM), a disk drive, an optical drive, a magnetic drive, and/or a Universal Serial Bus (USB) drive), a module 605 for configuring a communication network to process data traffic of a first customer via a network resource of a first network resource type that is selected based upon a customer segment of the first customer and an allocation matching scheme in accordance with predicted customer order weights by communication network customer segment and inventory demand weights for network resources of the first network resource type, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in FIG. 6, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 6 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 602 can also be configured or programmed to cause other devices to perform one or more operations as discussed above. In other words, the hardware processor 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 605 for configuring a communication network to process data traffic of a first customer via a network resource of a first network resource type that is selected based upon a customer segment of the first customer and an allocation matching scheme in accordance with predicted customer order weights by communication network customer segment and inventory demand weights for network resources of the first network resource type (e.g., a software program comprising computer-executable instructions) can be loaded into memory 604 and executed by hardware processor element 602 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for configuring a communication network to process data traffic of a first customer via a network resource of a first network resource type that is selected based upon a customer segment of the first customer and an allocation matching scheme in accordance with predicted customer order weights by communication network customer segment and inventory demand weights for network resources of the first network resource type (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:

segregating, by a processing system including at least one processor deployed in a communication network, a plurality of customers of the communication network into a plurality of communication network customer segments in accordance with at least one factor;

generating, by the processing system, a plurality of predicted customer order weights by communication network customer segment for a first network resource type in accordance with at least a first forecasting model comprising at least a first gradient boosted machine, wherein the first network resource type comprises: a hardware network element type, a network path type, a virtual network element type for a virtual network element hosted via one or more hardware network elements, a service type for a service hosted via the one or more hardware network elements, or an interface port type;

calculating, by the processing system, a plurality of inventory demand weights for a plurality of network resources of the first network resource type in the communication network in accordance with at least a second forecasting model comprising at least a second gradient boosted machine;

obtaining, by the processing system, a new customer order for the first network resource type from a first customer of the communication network; and configuring, by the processing system, the communication network to process data traffic of the first customer via one of the plurality of network resources of the first network resource type that is selected based upon a customer segment of the first customer and an allocation matching scheme in accordance with the plurality of predicted customer order weights by communication network customer segment and the plurality of inventory demand weights, wherein the configuring comprises configuring a provider edge network component in conjunction with a customer edge network component to process the data traffic of the first customer via the one of the plurality of network resources of the first network resource type that is selected.

2. The method of claim 1, wherein the segregating comprises segregating the plurality of customers by customer intensity values.

3. The method of claim 2, wherein each customer intensity value of the customer intensity values is calculated based upon counts of a number of network services utilized by a respective customer.

4. The method of claim 2, wherein the segregating comprises segregating the plurality of customers into the plurality of communication network customer segments in accordance with a distribution of values of the at least one factor associated with the plurality of customers.

5. The method of claim 1, wherein the at least the first forecasting model is trained with a training data set comprising historical order data for at least a portion of the plurality of customers of the plurality of customer segments.

6. The method of claim 1, wherein each of the plurality of predicted customer order weights by communication network customer segment is based upon an order count for the first network resource type by a subset of the plurality of customers of a particular customer segment.

7. The method of claim 6, wherein the each of the plurality of predicted customer order weights by communication network customer segment is further based upon an order count for a network resource category including a plurality of network resource types including the first network resource type by the subset of the plurality of customers of the particular customer segment.

8. The method of claim 1, wherein the at least the first forecasting model further comprises at least a first time series forecasting model.

9. The method of claim 1, wherein the at least the second forecasting model further comprises at least a second time series forecasting model.

10. The method of claim 1, wherein the at least the second forecasting model is trained with a training data set comprising historical allocations associated with the plurality of network resources.

11. The method of claim 10, wherein the historical allocations are across the plurality of communication network customer segments.

12. The method of claim 1, wherein the at least the second forecasting model is trained with a training data set comprising historical utilization measures associated with the plurality of network resources.

13. The method of claim 12, wherein the historical utilization measures are across the plurality of communication network customer segments.

14. The method of claim 1, wherein the at least the second forecasting model includes a respective forecasting model for the one of the plurality of network resources, wherein the respective forecasting model comprises a plurality of input factors for a plurality of network resource types associated with the hardware network element type, the plurality of network resource types including the first network resource type of the one of the plurality of network resources, and wherein the one of the plurality of network resources is associated with a hardware network element of the hardware network element type.

15. A non-transitory computer-readable medium storing instructions which, when executed by a processing system including at least one processor when deployed in a communication network, cause the processing system to perform operations, the operations comprising:

segregating a plurality of customers of the communication network into a plurality of communication network customer segments in accordance with at least one factor;

generating a plurality of predicted customer order weights by communication network customer segment for a first network resource type in accordance with at least a first forecasting model comprising at least a first gradient boosted machine, wherein the first network resource type comprises: a hardware network element type, a network path type, a virtual network element type for a virtual network element hosted via one or more hardware network elements, a service type for a service hosted via the one or more hardware network elements, or an interface port type;

calculating a plurality of inventory demand weights for a plurality of network resources of the first network resource type in the communication network in accordance with at least a second forecasting model comprising at least a second gradient boosted machine;

obtaining a new customer order for the first network resource type from a first customer of the communication network; and configuring the communication network to process data traffic of the first customer via one of the plurality of network resources of the first network resource type that is selected based upon a customer segment of the first customer and an allocation matching scheme in accordance with the plurality of predicted customer order weights by communication network customer segment and the plurality of inventory demand weights, wherein the configuring comprises configuring a provider edge network component in conjunction with a customer edge network component to process the data traffic of the first customer via the one of the plurality of network resources of the first network resource type that is selected.

16. An apparatus comprising:

a processing system including at least one processor; and a computer-readable medium storing instructions which, when executed by the processing system when deployed in a communication network, cause the processing system to perform operations, the operations comprising:

segregating a plurality of customers of the communication network into a plurality of communication network customer segments in accordance with at least one factor;

generating a plurality of predicted customer order weights by communication network customer segment for a first network resource type in accordance with at least a first forecasting model comprising at least a first gradient boosted machine, wherein the first network resource type comprises: a hardware network element type, a network path type, a virtual network element type for a virtual network element hosted via one or more hardware network elements, a service type for a service hosted via the one or more hardware network elements, or an interface port type;

calculating a plurality of inventory demand weights for a plurality of network resources of the first network resource type in the communication network in accordance with at least a second forecasting model comprising at least a second gradient boosted machine;

obtaining a new customer order for the first network resource type from a first customer of the communication network; and configuring the communication network to process data traffic of the first customer via one of the plurality of network resources of the first network resource type that is selected based upon a customer segment of the first customer and an allocation matching scheme in accordance with the plurality of predicted customer order weights by communication network customer segment and the plurality of inventory demand weights, wherein the configuring comprises configuring a provider edge network component in conjunction with a customer edge network component to process the data traffic of the first customer via the one of the plurality of network resources of the first network resource type that is selected.

17. The apparatus of claim 16, wherein the segregating comprises segregating the plurality of customers by customer intensity values.

18. The apparatus of claim 17, wherein each customer intensity value of the customer intensity values is calculated based upon counts of a number of network services utilized by a respective customer.

19. The apparatus of claim 17, wherein the segregating comprises segregating the plurality of customers into the plurality of communication network customer segments in accordance with a distribution of values of the at least one factor associated with the plurality of customers.

20. The apparatus of claim 16, wherein the at least the first forecasting model is trained with a training data set comprising historical order data for at least a portion of the plurality of customers of the plurality of customer segments.

* * * * *